(12) United States Patent
Dowd et al.

(10) Patent No.: US 9,164,599 B2
(45) Date of Patent: Oct. 20, 2015

(54) MULTIFUNCTIONAL STYLUS

(75) Inventors: Geoffrey Dowd, San Francisco, CA (US); Matthew Bice, San Francisco, CA (US); Nic Couillard, Berkeley, CA (US); Christoph Moskalonek, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 245 days.

(21) Appl. No.: 13/572,231

(22) Filed: Aug. 10, 2012

(65) Prior Publication Data
US 2014/0043245 A1 Feb. 13, 2014

(51) Int. Cl.
G06F 3/033 (2013.01)
G06F 3/0354 (2013.01)
G06F 3/0488 (2013.01)

(52) U.S. Cl.
CPC ........ G06F 3/03545 (2013.01); G06F 3/04883 (2013.01)

(58) Field of Classification Search
CPC ... G06F 3/03547; G06F 4/044; G06F 1/1626; G06F 2203/04105; G06F 3/041; G06F 3/03545; G06F 3/044; G06F 3/0383; G06F 2203/0384; G06F 3/0481; G06F 3/0484; G06F 3/0488; H04L 63/10; H04L 67/06; H04M 2250/64; H04W 12/08; H04W 8/183
USPC ............. 345/2.3, 173–179; 178/18.01–20.04; 455/566, 151.2, 186.2
See application file for complete search history.

(56) References Cited

U.S. PATENT DOCUMENTS

| | | | |
|---|---|---|---|
| 6,563,494 B1* | 5/2003 | Eichstaedt et al. | 345/179 |
| 6,648,536 B1* | 11/2003 | Bellue | 401/6 |
| 2009/0244015 A1* | 10/2009 | Sengupta et al. | 345/173 |
| 2010/0079404 A1* | 4/2010 | Degner et al. | 345/174 |
| 2012/0226983 A1* | 9/2012 | Goldenberg et al. | 715/724 |
| 2013/0106722 A1* | 5/2013 | Shahparnia et al. | 345/173 |
| 2013/0154956 A1* | 6/2013 | Tudosoiu | 345/173 |
| 2013/0278550 A1* | 10/2013 | Westhues | 345/174 |

OTHER PUBLICATIONS

Ten 1 Design, Pogo Connect, Bluetooth 4.0 Smart Pen, http://www.tenonedesign.com/connect.php; Apr. 2, 2013, 7 pages.
http://cpf.cieanprint.net/cpf/cpf?action=print&type=filePrint&key=cnn&url=http%3A%2F... Internet Article, Review: Samsung Galaxy Note 10.1 tablet is mightier with pen—CNN.com, Harry McCracken, 3 pgs., Aug. 17, 2012.
http://blogs.wsj.com/digits/2013/02/25/samsung-unveils-new-tablet-readies-galaxy-phone/[Feb. 25, 2013 12:54:52 PM], The Wall Street Journal, Monday, Feb. 25, 2013, as of 12:47pmest, article, "Samsung Unveils Tablet, Readies Phone", 4pgs.

\* cited by examiner

*Primary Examiner* — Abbas Abdulselam
*Assistant Examiner* — Gerald Oliver
(74) *Attorney, Agent, or Firm* — Shook, Hardy & Bacon, L.L.P.

(57) ABSTRACT

One exemplary embodiment involves receiving an input on a device, the input comprising at least one of an amount of pressure applied to the device against a computing device, a click of a physical button associated with the device, or a movement of the device against the computing device. The embodiment also includes transmitting the received input to the computing device via a wireless transceiver associated with the device. Additionally, the embodiment includes causing a plurality of actions to be performed on the computing device based at least in part on the received input.

20 Claims, 14 Drawing Sheets

MULTIFUNCTIONAL STYLUS

FIELD

This disclosure relates generally to electronic computer devices and more particularly relates to input devices used with touch screen computing devices.

BACKGROUND

Conventional touch screen computing devices have been configured to identify the positioning and/or movement of one or more fingers or other objects on or near touch surfaces of the devices. For example, touch screens associated with some touch computing devices have been configured for receiving input via finger gestures and to perform one or more functions in response to those finger gestures. Certain touch screen computing devices can receive input from stylus devices. A stylus is a writing, drawing, or pointing instrument or utensil that is generally configured to be hand held and, in the context of touch screen computing devices, used to interact with a touch surface. For example, touch screen computing device have identified input based on one end of the stylus moving on or near the touch surface of the computing device. Stylus have been used with personal digital assistant devices, tablet computing devices, smart phones, and other touch screen computing devices for handwriting, drawing, selecting icons, and providing other forms of input to such computing devices.

SUMMARY

One exemplary embodiment includes a stylus for interacting with one or more touch computing devices. The stylus includes a tip at one end of the stylus, the tip being configured to interact with a touch surface of a computing device. Additionally, the stylus includes a storage device for storing content. The stylus also includes a wireless transceiver for communicating with the computing device, wherein the wireless transceiver is configured to provide content from the storage device to the computing device.

These illustrative features are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Methods and systems are disclosed for a multifunctional stylus that functions as a device for interacting with one or more touch computing devices and as a storage device for storing content received from one or more touch computing devices. The stylus may also function as a wireless transceiver for transmitting and receiving content between the stylus and the computing devices. In one embodiment, a user may pair the stylus with one or more touch computing devices, such as for example, a tablet computer, a smart phone with a touch screen interface, and/or any other touch computing device. The user may then cause one or more actions to be performed on the touch computing device by interacting with the touch computing device using the stylus. For example, the actions performed on the touch computing device may be specific to the application being implemented by the touch computing device when the interaction occurs.

Additionally, the user may request to retrieve content on the touch computing device via the stylus. For example, in response to such a request, the touch computing device may allow the user to select the desired content. In one embodiment, the content may be stored on the stylus after being received at the stylus via the wireless transceiver associated with the stylus. For example, the stylus may receive the content via the wireless transceiver, such as a Bluetooth transceiver and/or a wireless network transceiver, and store the content on a storage device associated with the stylus. In another embodiment, the content may be stored on a cloud storage device associated with the stylus. Similarly, the user may use the stylus to request to transfer content stored on the stylus or an associated cloud or other storage device to the touch computing device. In this example, the content may be transferred from the stylus to the touch computing device via the wireless transceiver. In another embodiment, the user may transfer content stored on a first touch computing device to a second touch computing device, and/or vice versa. For example, the content from the first touch computing device may be stored on the storage device and then transmitted to the second touch computing device.

These illustrative examples are given to introduce the reader to the general subject matter discussed here and are not intended to limit the scope of the disclosed concepts. The following sections describe various additional embodiments and examples with reference to the drawings in which like numerals indicate like elements.

Figure 1:
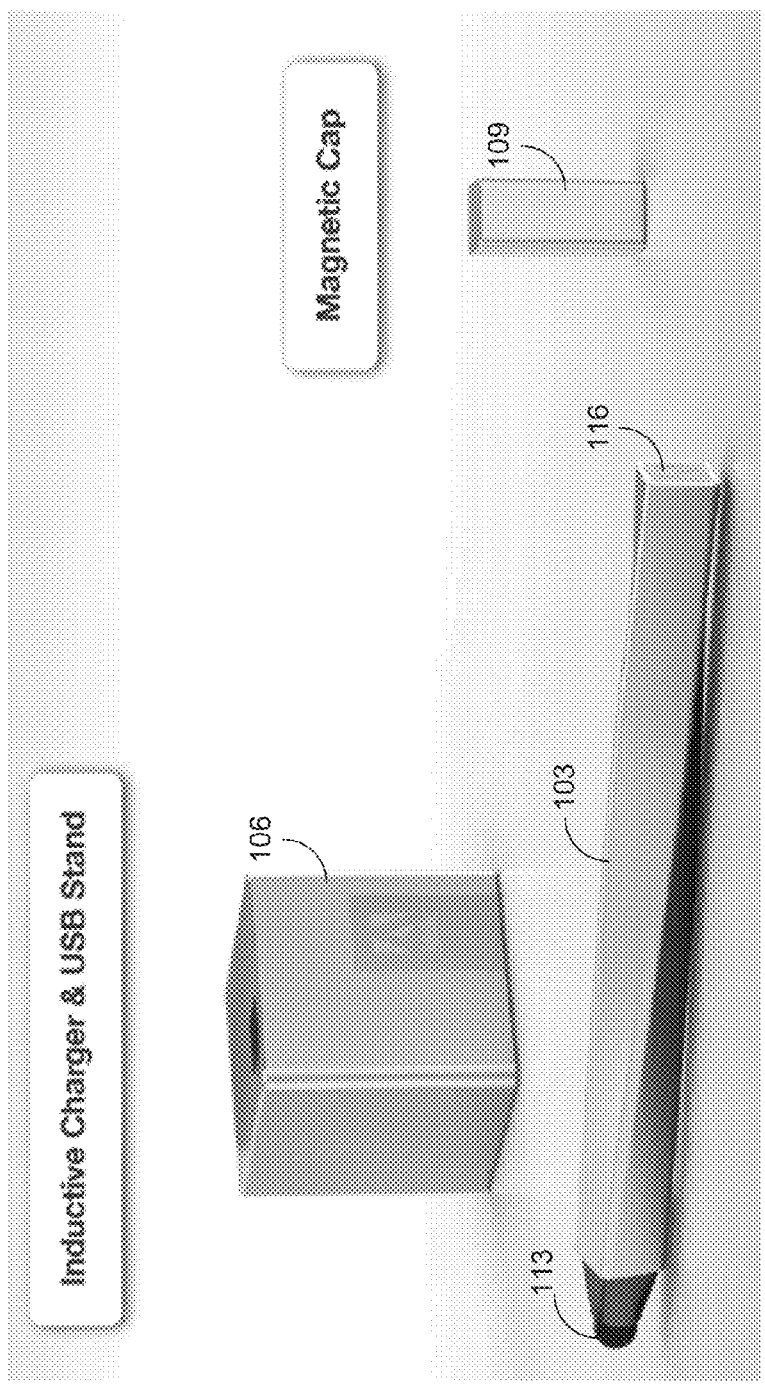
FIG. 1 is a block diagram depicting a stylus according to certain embodiments.

FIG. 1 depicts an exemplary stylus device 103 for implementing certain embodiments described herein. The stylus device 103 may be charged via an inductive charger 106 and may include a cap 109 that protects a tip 113 of the stylus device 103. Alternative embodiments may utilize other methods of charging or power supply and may or may not include a cap. In one embodiment, the stylus 103 may have an outer shape that twists along the length of the stylus 103 as shown in FIG. 1. Additionally, the stylus 103 may have a number of sides, such as four sides as shown in FIG. 1, where each one of the sides also twists along the length of the stylus 103. Additionally, the stylus 103 may have an optimal width and an optimal height to ergonomically enhance the stylus 103. The tip 113 of the stylus may be manufactured from a smooth and/or gentle material that is not harmful to the touch screen of the touch computing device. For example, the tip 113 may be manufactured from rubber, plastic, metal, and/or any other type of material. Additionally, included within the stylus 103 may be a memory, a wireless transceiver, a processing unit, and/or other components as discussed with respect to FIG. 2. To this end, the components within the stylus 103 may be distributed evenly such that the weight distribution of the stylus 103 is balanced.

A user operating the stylus 103 may interact with a touch computing device via the tip 113 of the stylus 103. For example, the user may move the stylus 103 such that the tip 113 moves across a touchscreen of the touch computing device, may apply pressure on the stylus 103 such that the tip 113 presses against the touchscreen, and/or other movements discussed with respect to FIG. 3. In one embodiment, the stylus device 103 also includes a LED 116 that illuminates based on a state of the stylus device 103. For example, the LED 116 may be illuminated to be red when the stylus 103 is charging on the inductive charger 106, blue when the stylus 103 is being paired with a computing device, green when the stylus 103 is performing a function, and/or any other color.

Figure 2:
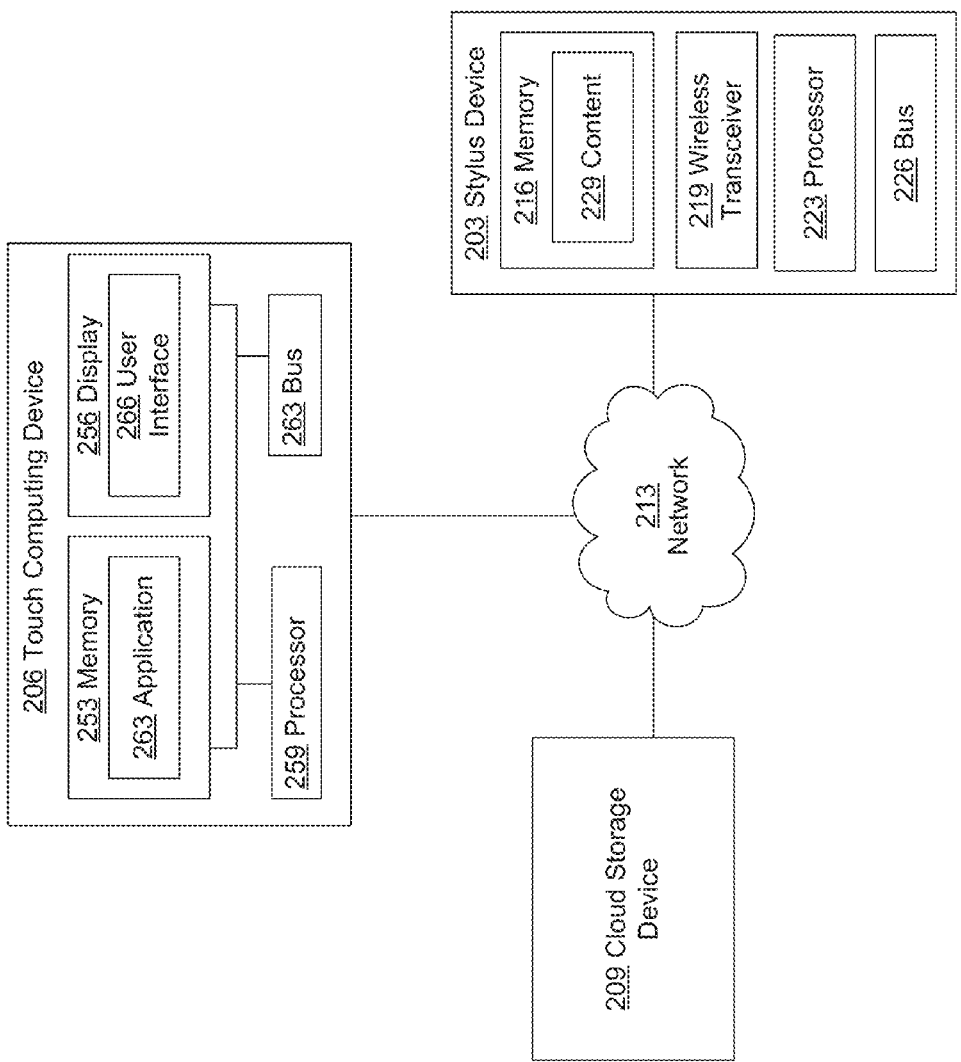
FIG. 2 is a block diagram depicting exemplary computing devices in an exemplary computing environment for implementing certain embodiments.

FIG. 2 depicts an exemplary computing environment for interfacing with touch computing devices as described herein. The methods and systems disclosed herein are also applicable on other computing systems and environments. The environment shown in FIG. 1 includes a wired or wireless network 213 connecting various devices 203, 206, and 209. In one embodiment, the network 213 includes the Internet. In other embodiments, other networks, intranets, or combinations of networks may be used. Alternative configurations are possible.

As used herein, the term "computing device" refers to any computing or other electronic equipment that executes instructions and includes any type of processor-based equipment that operates an operating system or otherwise executes instructions. A computing device will typically include a processor that executes program instructions and may include external or internal components such as a mouse, a CD-ROM, DVD, a keyboard, a display, or other input or output equipment. Examples of computing devices are personal computers, digital assistants, personal digital assistants, cellular phones, mobile phones, smart phones, pagers, digital tablets, laptop computers, Internet appliances, other processor-based devices, and television viewing devices. Exemplary computing devices 203, 206, and 209 are respectively used as special purpose computing devices to provide specific functionality offered by their respective applications and by the interaction between their applications. As an example, touch computing device 206 is shown with a display 256. A bus, such as bus 226 and bus 262, will typically be included in a device as well.

As used herein, the term "application" refers to any program instructions or other functional components that execute on a computing device. An application may reside in the memory of a device that executes the application. As is known to one of skill in the art, such applications may be resident in any suitable computer-readable medium and execute on any suitable processor. For example, as shown the devices 203 and 206 each have a computer-readable medium such as memory 216 and 253 coupled to a processor 223 and 259 that executes computer-executable program instructions and/or accesses stored information. Such processors 223 and 259 may comprise a microprocessor, an ASIC, a state machine, or other processor, and can be any of a number of computer processors. Such processors include, or may be in communication with, a computer-readable medium which stores instructions that, when executed by the processor, cause the processor to perform the steps described herein.

As used herein, the term "stylus" refers to any writing, drawing, or pointing instrument or utensil that is generally configured to be hand held and, in the context of touch screen computing devices, used to interact with a touch surface.

As used herein, the term "network storage device" refers to a storage device accessible over a network such as the network 213. Cloud storage is one form of network storage in which data is generally stored in virtualized pools and which is generally hosted by a third party. In one embodiment, a file service may be executed on a cloud storage device such that all of the data stored on the cloud storage device is accessible to numerous users. In another embodiment, the file service may be executed such that each user may be associated with a file system. For example, each user may access only the data of the file system that is associated with the respective user.

A computer-readable medium may include, but is not limited to, an electronic, optical, magnetic, or other storage device capable of providing a processor with computer-readable instructions. Other examples include, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

In FIG. 2, the stylus device 203 includes the memory 216 that includes content 229. In one embodiment, the content 229 may be any type of data stored on the stylus device 203. For example, the content 229 may be received by the stylus device 203 from the touch computing device 206. Additionally, the stylus device 203 includes a wireless transceiver 219 that may be a Bluetooth® transceiver, a wireless network transceiver, and/or another wireless transceiver. In one embodiment, wireless transceiver 219 facilitates the transmission of data between the stylus device 203, the touch computing device 206, the network storage device 209 and/or other devices. For example, the stylus device 203 may receive the content 229 from the touch computing device 206 via the wireless transceiver 219. In one embodiment, the stylus device 203 may communicate with the touch computing device 206 via Bluetooth®, a wireless network connection, and/or another manner of wireless communication. The stylus device 203 may communicate with the network storage device 209 via a wireless network connection, a 3rd generation mobile telecommunications (3G) network, a 4th generation mobile telecommunications (4G) network, and/or another manner of wireless communication. In one embodiment, the network storage device 209 may be remotely located and therefore inaccessible via Bluetooth® and/or similar geographically limited forms of wireless communications.

The touch computing device 206 includes the memory 253 that includes one or more applications 263. In one embodiment, the applications 263 may perform a variety of functions and render a user interface 266 on the display 256 associated with the touch computing device 206. Additionally, the display 256 may be a touch screen configured to receive input via the touch screen. For example, a user may operate the stylus device 203 to manipulate the user interface 266 rendered on the touch screen display 256. In addition, the cloud storage device 209 may be a remotely located storage device that is accessible via the network 213. For example, a user of the stylus device 203 may have one or more user accounts on the cloud storage device 209 where data associated with the user may be stored.

In another embodiment, the touch computing device 206 may include other input/output devices such as a number of external or internal devices such as a mouse, a CD-ROM, DVD, a keyboard, a display, audio speakers, one or more microphones, or any other input or output devices. Additionally, the touch computing device 206 may be a personal computing device, a mobile device, a tablet device, a smart phone device, and/or any other type of electronic devices appropriate for providing one or more of the features described herein.

Figure 3:
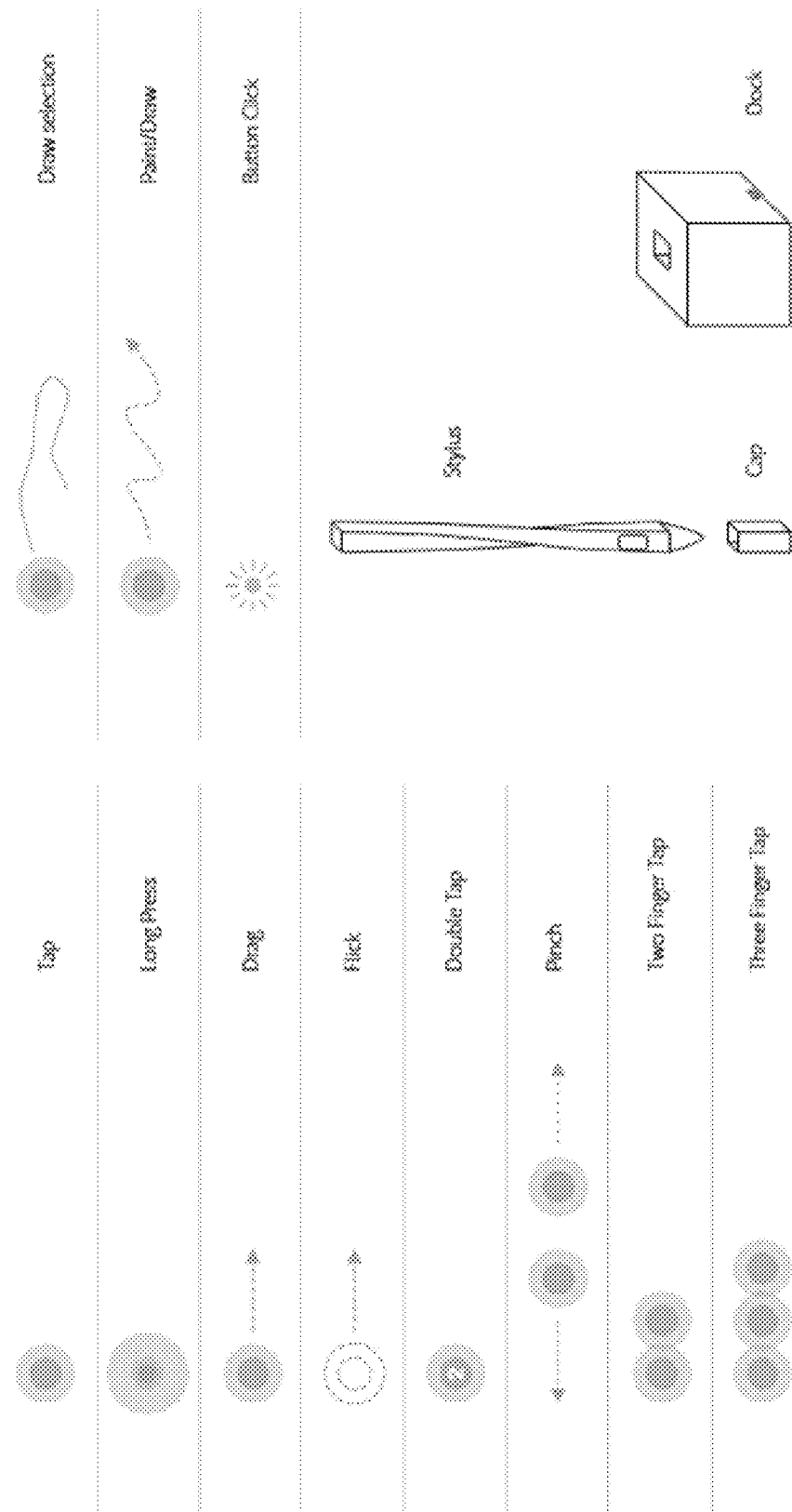
FIG. 3 is a diagram depicting exemplary forms of input capable of being provided via an exemplary stylus.

FIG. 3 depicts the forms of input that may be indicated via the stylus 103 (FIG. 1). For example, the stylus 103 may provide an input by tapping the tip 113 (FIG. 1) of the stylus 103 against a touch screen of a touch computing device. A single tap against the screen of the touch computing device may cause one or more actions to be performed by an application being implemented by the touch computing device. Similarly, the stylus 103 may be used to indicate other forms of input such as a long press of the tip 133 of the stylus 103 against the touch screen and a double tap of the tip 133 of the stylus 103 against the touch screen. The stylus 103 may also be used to indicate an input based on an amount of pressure applied by a user. For instance, the stylus 103 may measure the pressure applied by the user and transmit an input via the wireless transceiver 219 (FIG. 2) based on the amount of pressure applied. Additionally, other forms of input include dragging the tip 113 against the touch screen and flicking the tip 113 against the touch screen. Further, a selection may be drawn by outlining a desired selection with the tip 113. Still further, two finger inputs may be emulated with the stylus 103 such as pinching, two finger tapping, and three finger tapping. For example, a combination of the stylus 103 and one or more fingers may be applied to emulate multi-finger inputs. In another embodiment, the stylus 103 may include a button that may be depressed and/or clicked to indicate another form of input. For example, the button may be a physical button displaced on the exterior of the stylus 103 along one of the sides of the stylus 103. In one embodiment, the button may be located on one end of the stylus 103, such as the near the tip 113.

Figure 4:
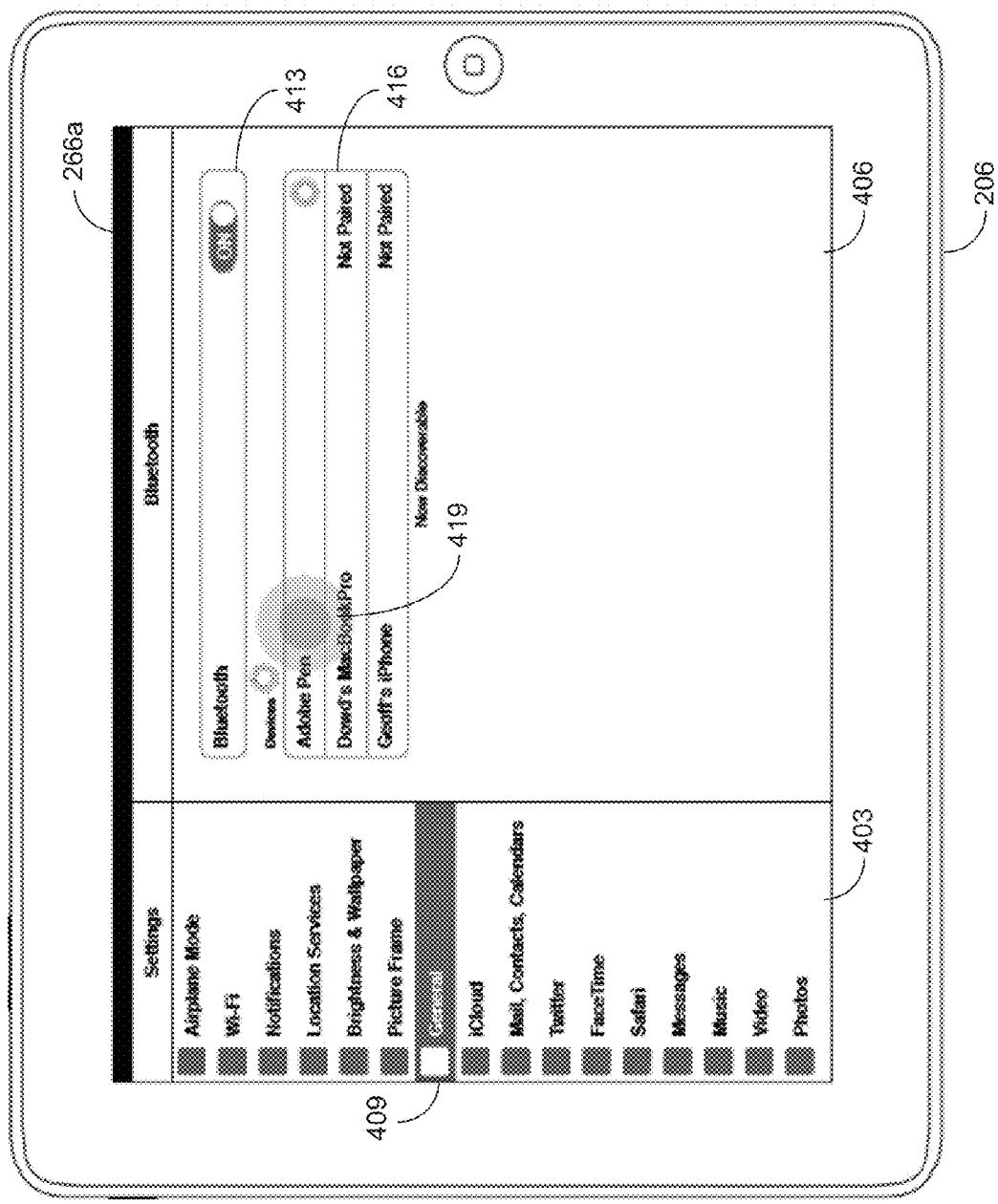
FIG. 4 depicts an exemplary user interface rendered on a display of a touch computing device that includes settings for configuring an exemplary stylus.

FIG. 4 shows one example of a user interface 266 (FIG. 1), depicted herein as user interface 266a, according to certain embodiments of the present disclosure, that is rendered on the display 256 (FIG. 1) of the touch computing device 206 (FIG. 1). In this example, the user interface 266 depicts a settings menu for the touch computing device 206 to configure certain features of the device. Shown in user interface 266a are a settings panel 403 and a details panel 406. The settings panel 403 includes a list of features of the touch computing device 206 that may each be selected for configuration. For example, the list of features in the settings panel 403 includes an "airplane mode," "Wi-Fi," "Notifications," and/or other settings for configuring the touch computing device 206.

In this example, the "General" feature 409 is selected and the details that correspond to the "General" feature are depicted in the details panel 406. As shown, one of the items in the "General" feature is configuring Bluetooth® functionality. When the Bluetooth® configuration 413 is turned on, the touch computing device 206 generates a list of available devices 416 with which to connect over Bluetooth®. For example, the list of available devices 416 may include a stylus device (i.e., the stylus 203 (FIG. 2) such as the Adobe® Pen), a laptop device such as "Dowd's MacBookPro," a smart phone such as "Geoff's iPhone," and/or any other Bluetooth® capable device. In this example, the user operating the touch computing device 206 may select the stylus 203. For instance, the user may touch "Adobe® Pen" on the screen of the touch computing device 206 at 419. In response, the touch computing device 206 may process the request and advance to another user interface, as will be described with respect to FIG. 5.

Figure 5:
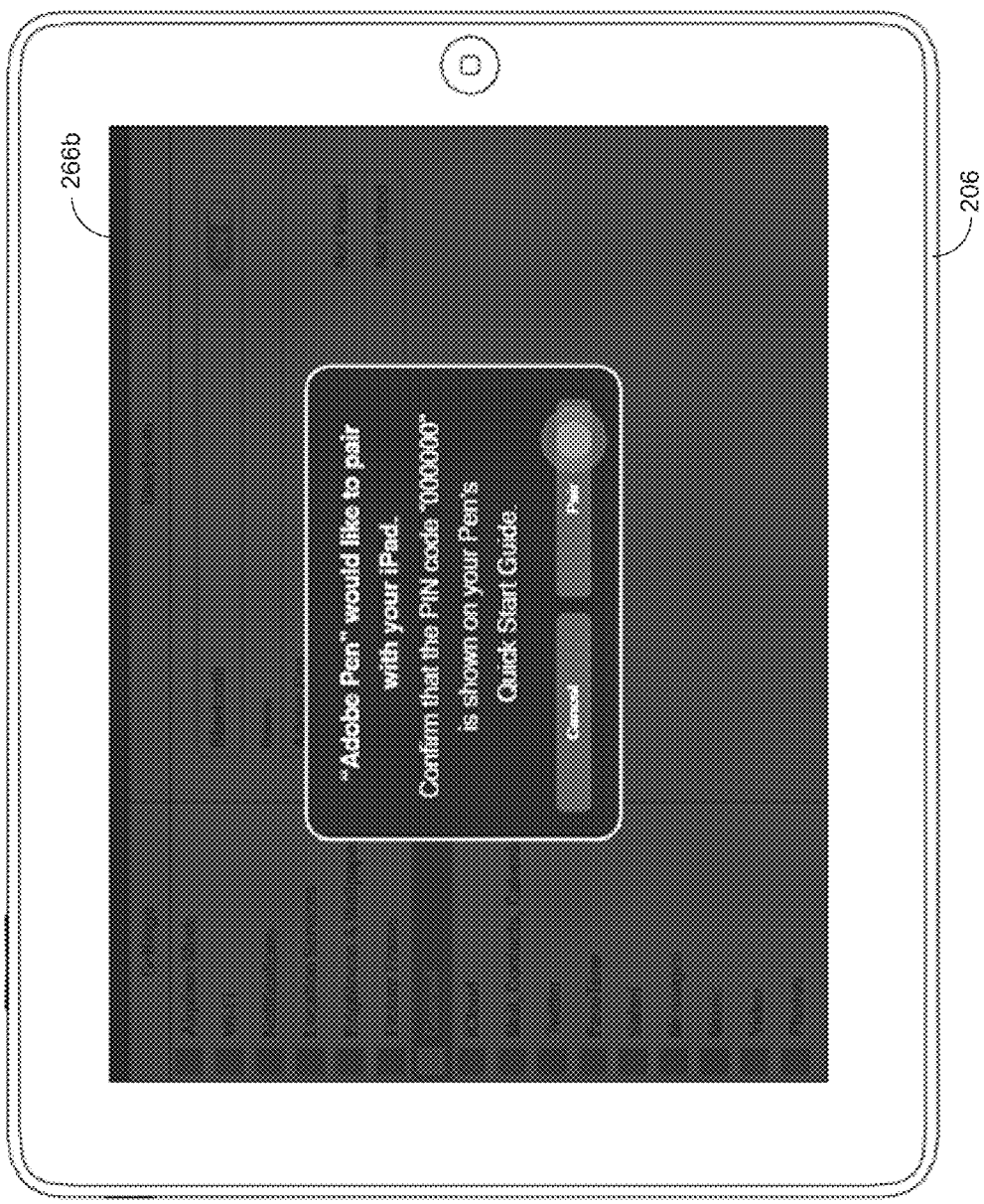
FIG. 5 depicts an exemplary user interface rendered on a display of a touch computing device that includes an option to pair a stylus with a touch computing device.

FIG. 5 shows one example of a user interface 266, depicted herein as user interface 266b, according to certain embodiments of the present disclosure, that is rendered on the display 256 (FIG. 1) of the touch computing device 206. In one embodiment, the touch computing device 206 may display a confirmation dialog box as shown in FIG. 5. The user operating the touch computing device 206 may select to pair the stylus 103 (FIG. 1) with the touch computing device 206. In response, the user may be presented with a series of user interfaces to pair the device with the touch computing device 206. Any of a variety of techniques may be employed for pairing the stylus 103 with the touch computing device 206. For example, the user may be presented with a user interface that prompts the user to enter a pin code, a pass code, and/or other form of password that pairs the devices together. In another embodiment, the touch computing device 206 may communicate with the stylus 103 directly via Bluetooth without an initial pairing process.

In one embodiment, a LED 116 (FIG. 1) of the stylus 103 may change color while the stylus 103 is pairing with the touch computing device 206. For example, the LED 116 may turn a solid blue and/or another color. As another example, the LED 116 may pulse blue and/or another color while the stylus 103 and the touch computing device 206 are performing the pairing operation. Once the stylus 103 and the touch computing device 206 have been paired, the LED 116 may turn off to indicate that the pairing operation is over.

In one embodiment, the stylus 103 may be initialized for use with the touch computing device 206 upon pairing. To this end, the stylus 103 may be secured such that the stylus 103 may only be usable by one user. In one embodiment, as part of the initialization, the user is prompted to provide a secure signature. For example, the touch computing device 206 renders a user interface 266 that prompts the user to provide a user signature on a portion of the user interface 266 using the stylus 103. The user may then provide the user signature by applying the tip 113 (FIG. 1) of the stylus 103 against the touch screen of the touch computing device 206 and signing. In one embodiment, the user may be prompted to provide the user signature multiple times to ensure consistency. On subsequent uses, the user may activate the stylus 103 for use with the touch computing device 206 by signing the touch screen of the touch computing device 206. A security application 263 being implemented on the touch computing device 206 may authenticate the signature with the previously established signature and authorize access upon a match.

Figure 6:
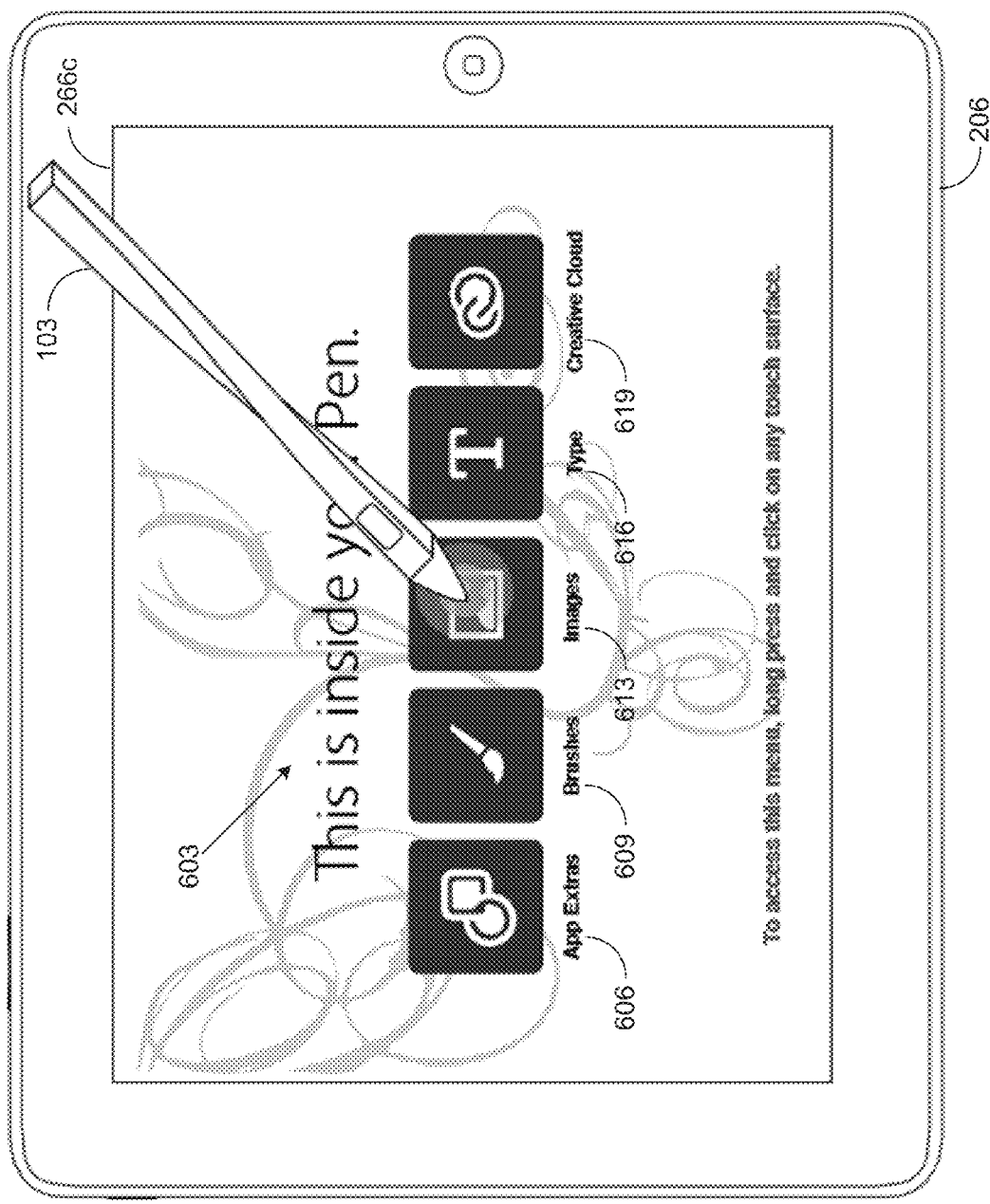
FIG. 6 depicts an exemplary user interface rendered on a display of a touch computing device that depicts a menu associated with a stylus.

FIG. 6 shows one example of a user interface 266, depicted herein as user interface 266c, according to certain embodiments of the present disclosure that is rendered on the display 256 (FIG. 1) of the touch computing device 206. The user interface 266c depicts a stylus menu 603 for performing various functions via the stylus 103. In one embodiment, to access the stylus menu 603, the user may perform a long press by applying the tip 113 (FIG. 1) of the stylus 103 against the touch screen of the touch computing device 206 for a long enough period of time to perform a "long press." An application 263 being implemented on the touch computing device 206 may receive the input and determine that the received input is a "long press." In response, the stylus menu 603 may be rendered on the display 256. In another embodiment, the user may access the stylus menu 603 by clicking a button associated with the stylus 103, by performing another input, and/or a combination of inputs.

The stylus menu 603 includes an extras button 606, a brushes button 609, an images button 613, a type button 616, and a cloud button 619. The user may select each one of the buttons in the stylus menu 603 via the stylus 103 by performing one or more of the input indications descried above, with respect to FIG. 3. In one embodiment, invoking the extras button 606 may transmit a request to access exclusive content associated with the application 263 (FIG. 2) being implemented on the touch computing device 206. Invoking the brushed button 609 may transmit a request to execute a drawing application, paint application, and/or other related application. Similarly, invoking the type button 616 transmits a request to execute a typing application, a word processing application, and/or other related application.

Invoking the images application 613 transmits a request to access the images and/or other content 229 (FIG. 2) stored on the stylus 103. For instance, one or more images may be stored on a storage device included in the stylus 103. In one embodiment, the images stored on the stylus 103 may be received by the touch computing device 206 via the Bluetooth® connection between the touch computing device 206 and the stylus 103. In another embodiment, the images stored on the stylus 103 may be received via a wireless network connection and/or another wireless connection between the devices. Upon receiving the images, the touch computing device 206 may render the images on the touch screen in a user interface 266. Once rendered, the user may browse the images using the stylus 103 and perform a variety of operations such as copy an image, delete an image, and/or otherwise modify the rendered images.

Invoking the cloud button 619 transmits a request to access content stored on a cloud storage device 209 (FIG. 2). In one embodiment, the stylus 103 may transmit a request to receive the content stored on the cloud storage device 209 and provide the content from the cloud storage device 209 to the touch computing device via the wireless transceiver 219 (FIG. 1). For example, the wireless transceiver 219 may transmit the request and provide the content via a wireless network. In another embodiment, the touch computing device 206 may directly transmit the request to receive the content stored on the cloud storage device 209. Upon receiving the content, the touch computing device 206 may render the content on the touch screen in a user interface 266. The content stored on the cloud storage device 209 may be text, images, videos, sounds or other audio, documents, applications and other executable files, and/or any other type of content. The user may then browse the available content via the stylus 103, as discussed above. In one embodiment, the stylus is associated with a license to use a particular software application, e.g., a particular drawing application, and the user is able to use that software application under the terms of the license when using the stylus on any computing device, regardless of whether the computing device is licensed to use the application or not.

Figure 7:
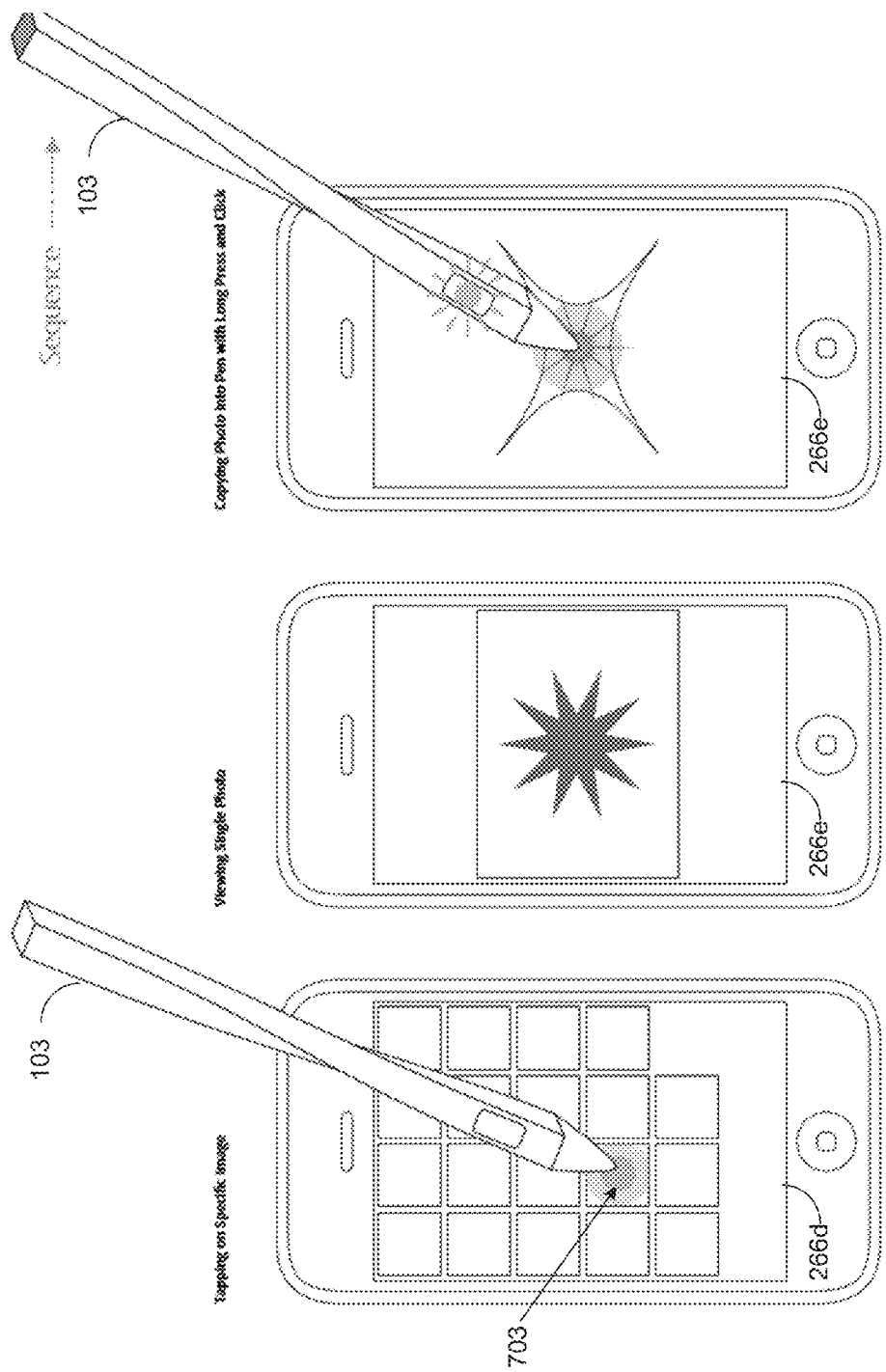
FIG. 7 depicts exemplary user interfaces rendered on a display of a first touch computing device depicting a sequence of actions for copying an image caused to be performed by a stylus.

FIG. 7 shows examples of user interfaces 266, depicted herein as user interfaces 266d, 266e, and 266f, according to certain embodiments of the present disclosure that is rendered on the display 256 (FIG. 1) of the touch computing device 206 (FIG. 1). In this embodiment, the touch computing device 206 is represented by a smart phone. Additionally, the stylus 103 may have already been initialized for use with the touch computing device 206 (i.e., the smart phone). Beginning with user interface 226d, the touch computing device 206 may be implementing an application 263 (FIG. 1) that rendered a number of images on the touch screen of the touch computing device 206. For example, the application 263 may be a browser, an image collection application, and/or other application. A user operating the stylus 103 may browse the images rendered on the touch screen, as discussed above.

In one embodiment, the user may desire to view a larger version of one of the images rendered on the touch screen. To this end, the user may select the desired image by tapping on the image with the tip 113 (FIG. 1) of the stylus 103. Alternatively or additionally, the user may provide another form of input such as one or more of the inputs discussed above, with respect to FIG. 3. For instance, the user may indicate a selection 703 of an image rendered on the touch screen. In response, the application 263 may render user interface 266e that includes a larger version of the selected image. The user may then transmit requests to the application 263 to perform a number of operations involving the rendered image via the stylus 103.

For example, as shown in user interface 266e, the user may provide one of a variety of inputs by manipulating the stylus 103 against the touch screen of the touch computing device 206. In one embodiment, the user may click a button on the stylus 103 to provide an input. In another embodiment, the user may tap the touch screen with the tip 113 of the stylus 103, drag the stylus 103 against the touch screen, provide some other input as discussed above, and/or provide a combination of the inputs. As an example, the user may desire to copy the image presented in user interface 266. To this end, the user may provide the input that corresponds with copy the image (such as, tapping the image with the tip 113 of the stylus 103). In response, the application 263 may copy the image and provide the image to the stylus 103. For example, the stylus 103 may transmit a request to receive the copied image to the touch computing device 206 via the wireless transceiver 219 (FIG. 2). In response, the touch computing device 206 may transmit the copied image to the stylus 103 over the network 213 (FIG. 1). In one embodiment, the stylus 103 may store the image in memory 216 (FIG. 1) of the stylus 103 and/or transmit the received image to the cloud storage device 209 (FIG. 1). Additionally, the LED 116 of the stylus 103 may be lit a certain color to indicate that data is being received by the stylus 103, that data is being stored by the stylus 103, and/or indicate some other status.

Figure 8:
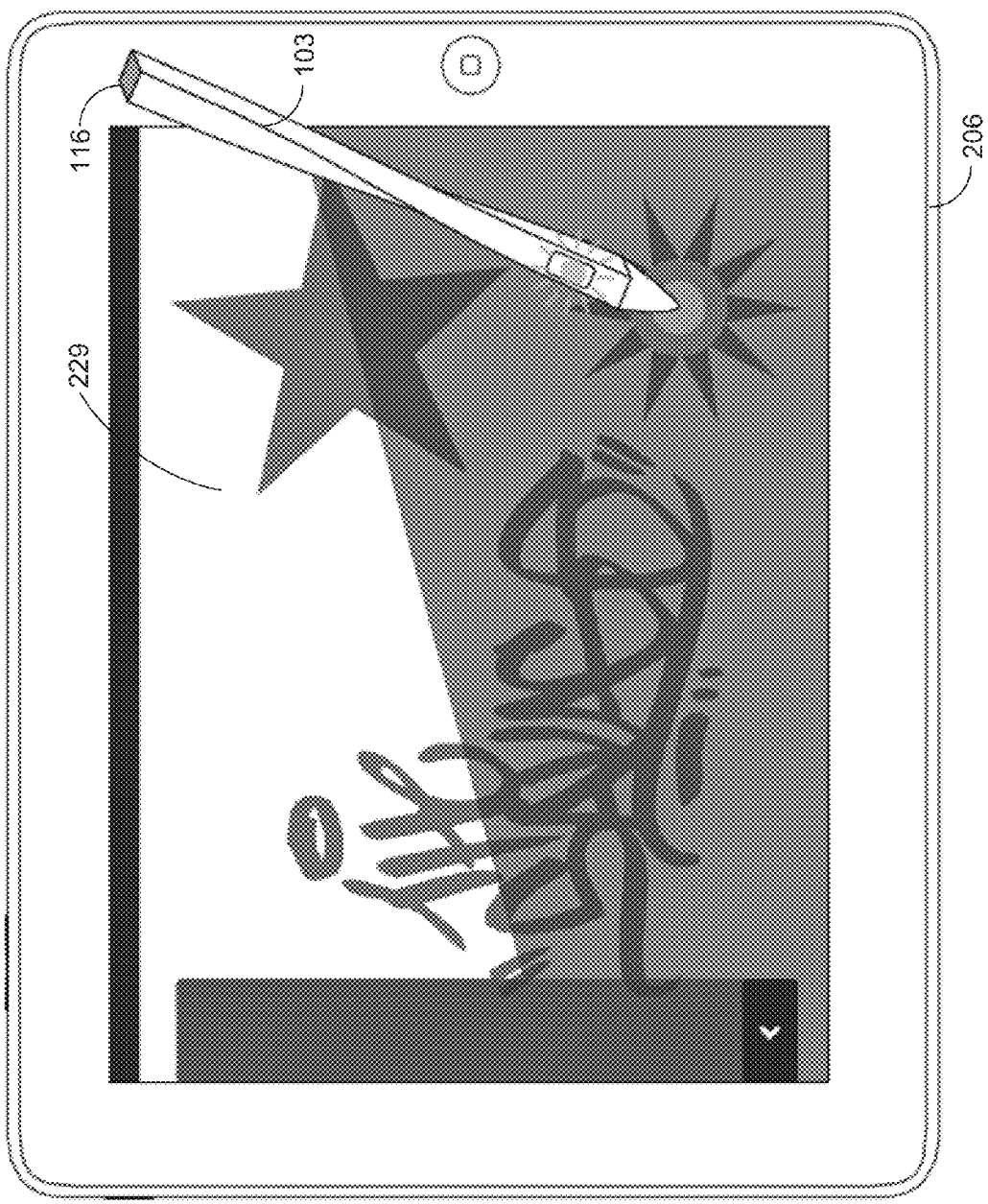
FIG. 8 depicts an exemplary user interface rendered on a display of a second touch computing device depicting an action for pasting an image caused to be performed by a stylus.

FIG. 8 shows one example of a user interface 266, depicted herein as user interface 266f, according to certain embodiments of the present disclosure that is rendered on the display 256 (FIG. 1) of the touch computing device 206. In this example, the touch computing device 206 is a tablet device and differs from the touch computing device 206 discussed above with respect to FIG. 7. For instance, the touch computing device 206 in FIG. 7 is a smartphone, as previously indicated. In FIG. 8, the stylus 103 may have already been paired and/or initialized for use with the touch computing device 206.

Figure 9:
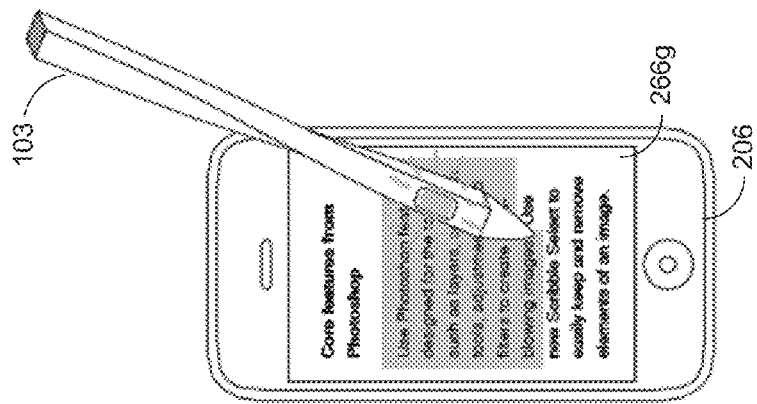
FIG. 9 depicts an exemplary user interface rendered on a display of a first touch computing device depicting an action for copying text caused to be performed by a stylus.

The user of the computing device 206 may desire to transfer content 229 stored in memory 216 of the stylus 103. For instance, the user may wish to transfer the image stored in the memory 216 of the stylus 103 as discussed above with respect to FIG. 7. In one embodiment, the user may provide one or more inputs to the touch computing device 206 to request a relevant application 263 (FIG. 1) be implemented by the touch computing device 206. For example, the user may request that an application 263 such as a drawing application and/or a painting application be implemented by the touch computing device 206. Then, the user may provide one or more inputs to the touch computing device 206 to transfer the content 229 (i.e., the stored image) from the memory 216 of the stylus 203 to the touch computing device 206. For instance, the user may invoke a button associated with the stylus 103 and/or provide another form of input, as discussed above. In response, the application 263 may receive the content 229 from the stylus 103 via the wireless transceiver 219 (FIG. 1) of the stylus 103. For instance, the application 263 may receive the content 229 via Bluetooth®, the network 213 (FIG. 2), and/or other network. Upon receiving the content 229, the application 263 renders the received content (i.e., stored image) on the display 256 of the touch computing device 206. In one embodiment, the LED 116 of the stylus 103 may change color to indicate that one or more operations are being implemented by the stylus 103. For example, the color of the LED 116 may be based on the operation being performed FIG. 9 shows one example of a user interface 266, depicted herein as user interface 266g, according to certain embodiments of the present disclosure that is rendered on the display 256 (FIG. 1) of the touch computing device 206. In this example, the touch computing device 206 may be a smart phone (as depicted here), a tablet device, and/or any other touch computing device. The application 263 (FIG. 1) being implemented on the touch computing device 206 renders a user interface 226g on the display 256 that includes a quantity of text. The user operating the touch computing device 206 may wish to copy the text rendered on the display 256. To this end, the user may provide one or more inputs via the stylus 103 to transmit a request to the touch computing device 206 to copy the text and transfer the copied text to the stylus 103.

As an example, the user may drag the tip 113 (FIG. 1) of the stylus 103 along the desired portion of the text to highlight the text to be copied. Upon highlighting the desired text, the user may additionally click the button associated with the stylus 103, tap the highlighted text, and/or provide some other form of input to transmit a request to copy the highlighted text. In response, the application 263 copies the highlighted text and transmits the copied text to the stylus 103. The stylus 103 may receive the copied text via the wireless transceiver 219 (FIG. 2) associated with the stylus 103 and store the received text in the memory 216 (FIG. 2) of the stylus 103 as content 229 (FIG. 2). In another embodiment, the stylus 103 may transmit the copied text upon receipt to the network storage device 209 (FIG. 2) via the wireless transceiver 219. In a further embodiment, the application 263 may transmit the copied text to the network storage device 209 upon receiving an input via the stylus 103.

Figure 10:
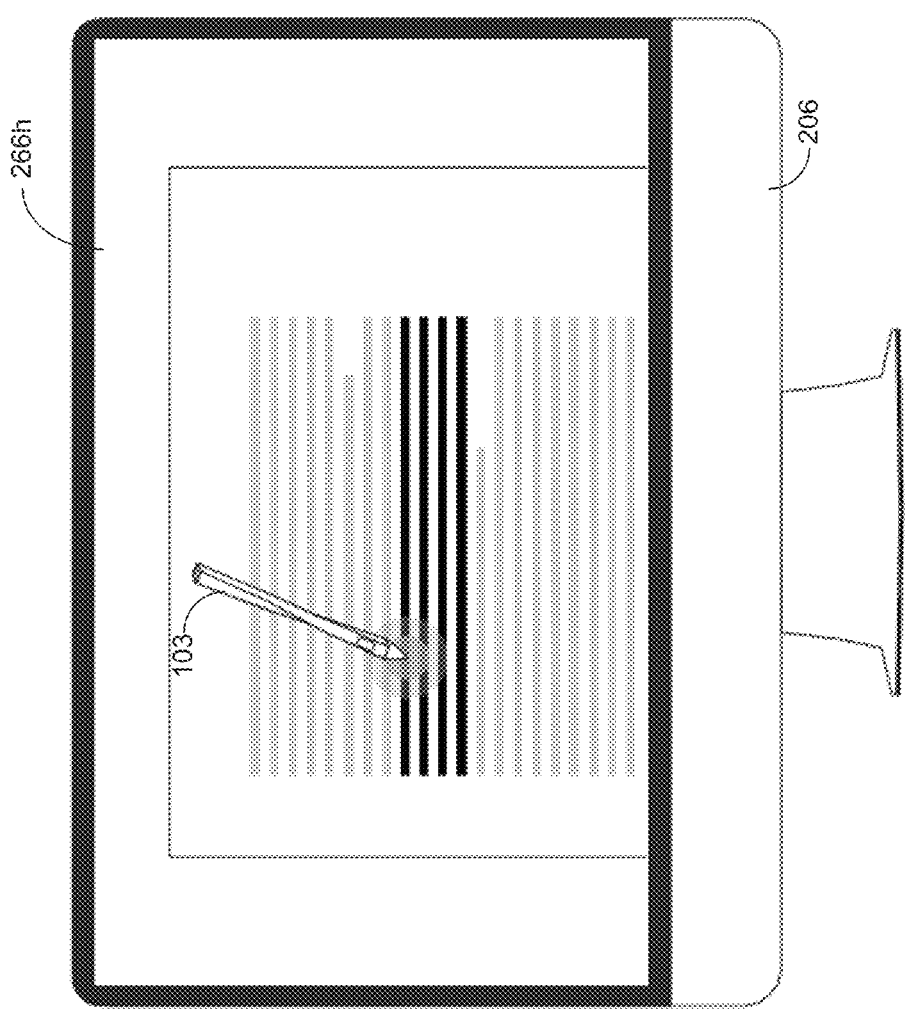
FIG. 10 depicts an exemplary user interface rendered on a display of a third computing device depicting an action for pasting text caused to be performed by a stylus.

FIG. 10 shows one example of a user interface 266, depicted herein as user interface 266h, according to certain embodiments of the present disclosure that is rendered on the display 256 (FIG. 1) of the touch computing device 206. In this example, the touch computing device 206 may be a personal computer with a touch screen (as depicted here), a smart phone, a tablet device, and/or any other touch computing device. The application 263 (FIG. 1) being implemented on the touch computing device 206 renders a user interface 226h on the display 256 that includes a quantity of text. In one embodiment, the user may desire to paste the stored content 229 (FIG. 2) into the text included on the user interface 226h. To this end, the user may provide one or more inputs to the touch computing device 206 via the stylus 103 to indicate a location at which to paste the stored content 229. Additionally, the stylus 103 may transmit the stored content 229 to the touch computing device 206 via the wireless transceiver 219. The application 262 being implemented on the touch computing device 206 receives the content 229 (i.e., the stored text) and inserts the text at the indicated location.

Figure 11:
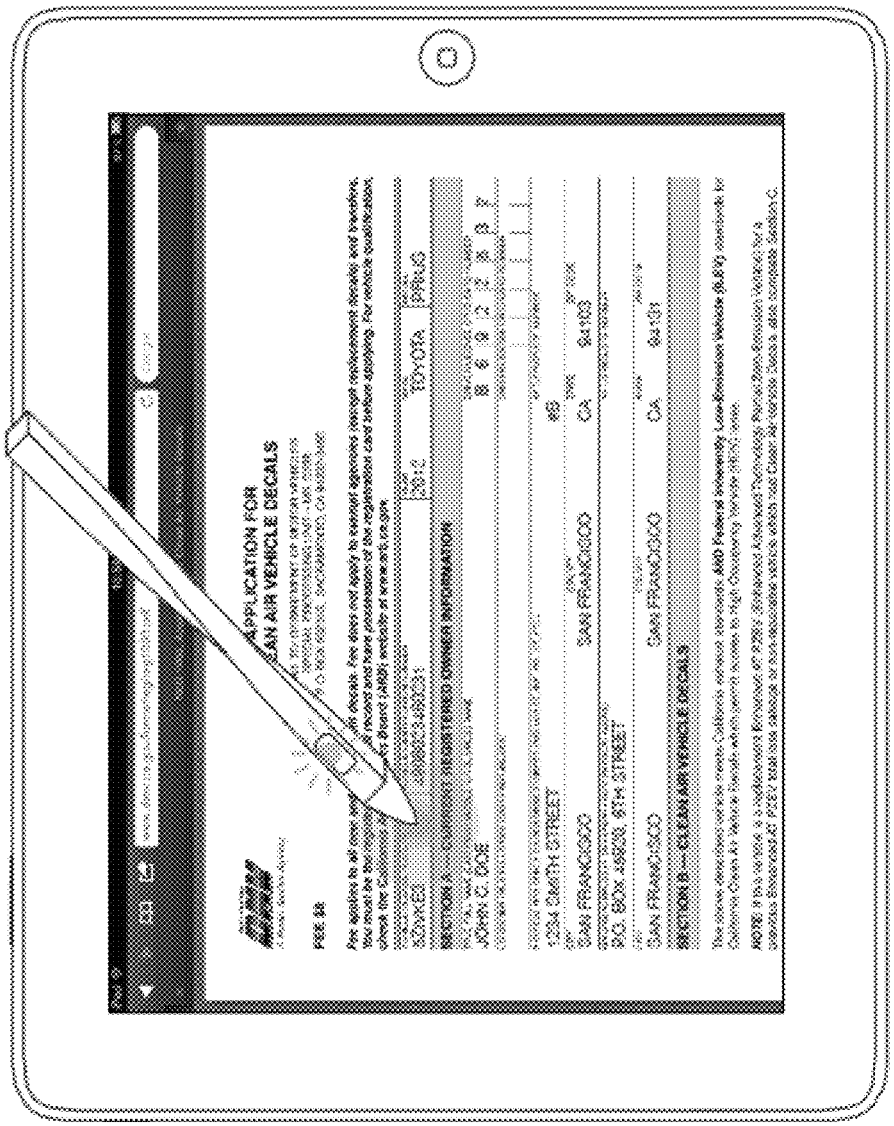
FIG. 11 depicts an exemplary user interface rendered on a display of a touch computing device depicting an action for auto-filling text caused to be performed by a stylus.

FIG. 11 shows one example of a user interface 266, depicted herein as user interface 266i, according to certain embodiments of the present disclosure that is rendered on the display 256 (FIG. 1) of the touch computing device 206. In this example, the touch computing device 206 is implementing an application 263 (FIG. 2) that renders a document, such as for instance, a Department of Motor Vehicles (DMV) application. In one embodiment, the user may desire to automatically fill in the content 229 (FIG. 2) into the document rendered by the application 263. To this end, the user many provide one or more inputs via the stylus 103 to transmit an indication to the touch computing device 206 to copy the content 229 on the stylus 103. The stylus 103 may transmit the content 229 from the memory 216 (FIG. 2) via the wireless transceiver 219 (FIG. 2). The application 263 may receive only the portion of the content 229 compatible with the application 263. For example, the content 229 stored on the stylus 203 may include a variety of information such as personal information associated with the user operating the stylus 103, documents, images, text, and/or other information. The application 263 may receive only the compatible content 229 and automatically fill in the document rendered on the display 256. In another embodiment, the content to be received by the application 263 may be stored on the network storage device 209 (FIG. 2).

Figure 12:
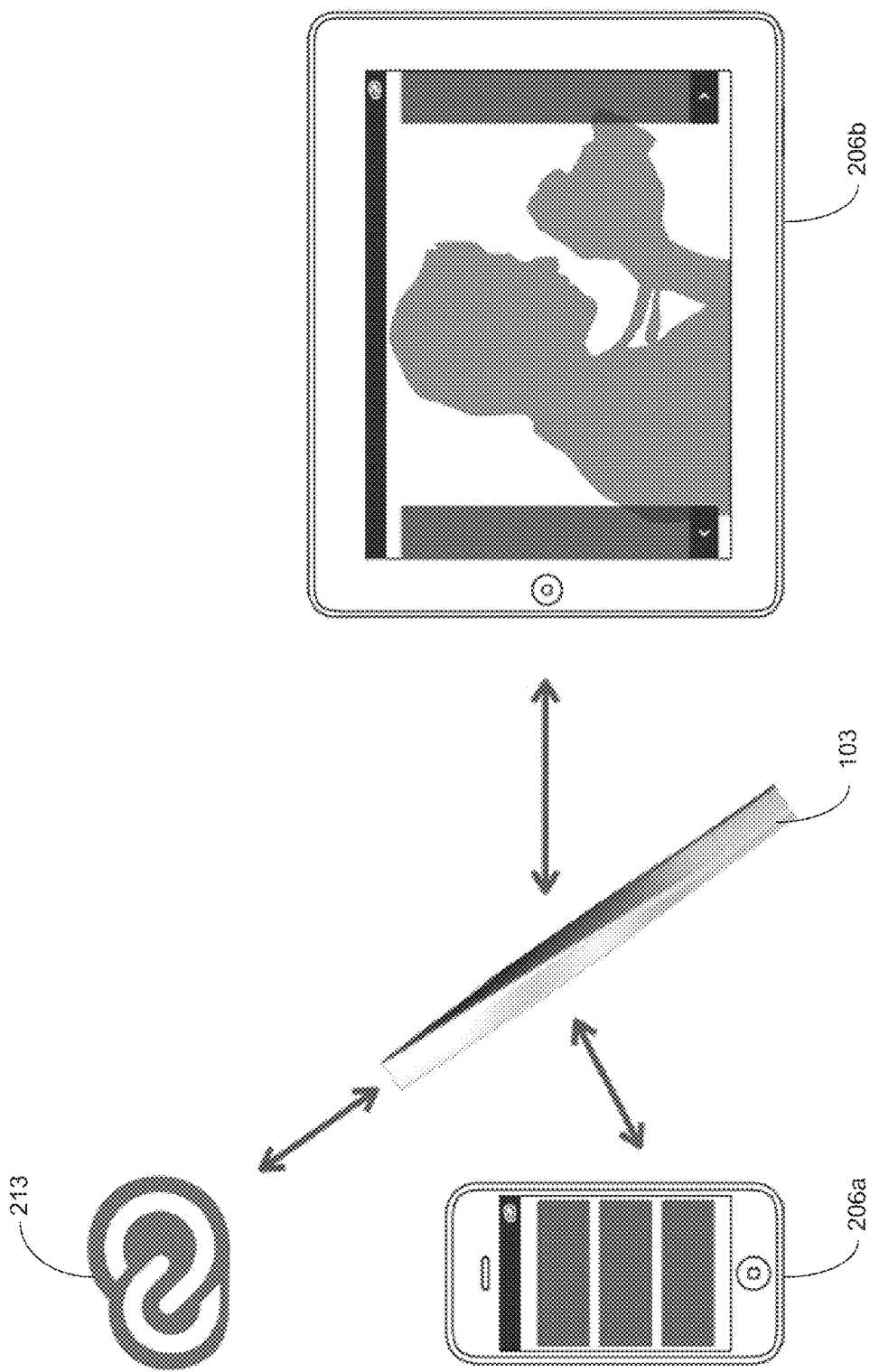
FIG. 12 illustrates an exemplary stylus device configured to interact with a plurality of devices.

FIG. 12 depicts an exemplary embodiment of a stylus 103 configured to communicate with a plurality of touch computing devices 206a and 206b, and a network storage device 209. In one embodiment, the stylus 103 may communicate with a first touch computing device 206a, such as a smart phone, via a wireless network 213 (FIG. 2) as described above. For example, the stylus 103 may copy content stored on the first touch computing device 206a and store the copied content on the network storage device 209. The content copied from the first touch computing device 206a may be data such as media files, documents, contact information, text, and/or any other type of data capable of being stored on the first touch computing device 206a. The stylus 103 may also communicate with a second touch computing device 206b, such as a tablet computer, via a wireless network 213, as described above. In one embodiment, the stylus 103 may facilitate the content stored on the network storage device 213 to be copied to the second touch computing device 206b. In another embodiment, the stylus may facilitate the transfer of content from the second touch computing device 206b to the first touch computing device 206a via the network 213.

Figure 13:
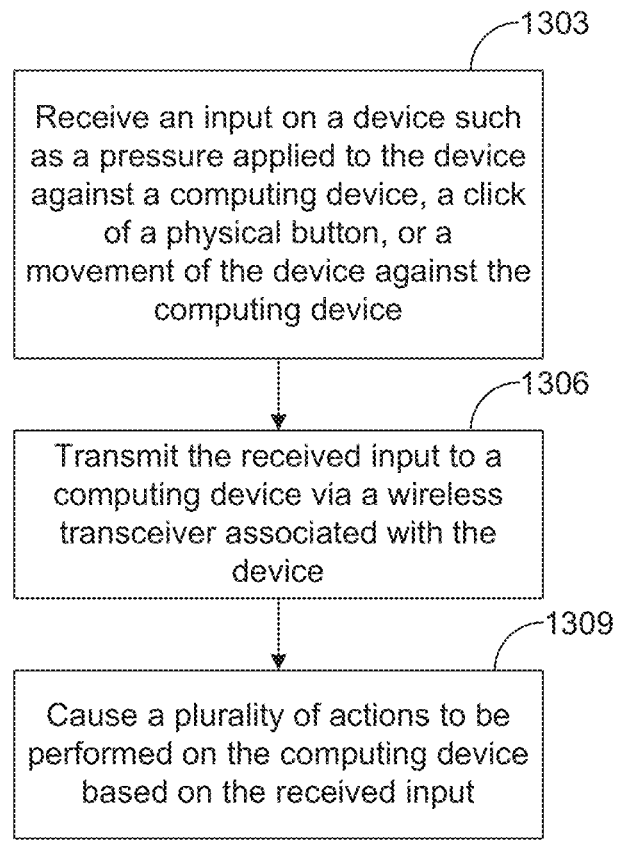
FIG. 13 is a flow chart illustrating an exemplary method for receiving an input on a stylus from a user and transmitting the input to the touch computing device to cause one or more actions to be performed on the touch computing device.

FIG. 13 is a flowchart that provides one example of the operation of a portion of the system described herein. It is understood that the flowchart of FIG. 13 provides merely an example of the many different types of functional arrangements that may be employed to implement the operation of the portion of the system as described herein. As an alternative, the flowchart of FIG. 13 may be viewed as depicting an example of steps of a method implemented by the system described herein according to one or more embodiments.

Beginning with step 1303, a computing device such as a touch computing device 206 (FIG. 2) receives an input via the stylus 103 (FIG. 1) from a user operating the device. In one embodiment, the received input may include an amount of pressure applied to the stylus 103 against a touch computing device 206 (FIG. 1), a click of a physical button associated with the stylus 103, or a movement of the device against the touch computing device 206. For example, the input may be a tap by the tip 113 (FIG. 1) of the stylus 103 against a touch screen of the touch computing device 206, a drag of the tip 113 against the touch screen, and/or another form of input as discussed above with respect to FIG. 3.

Next, in step 1306, the device transmits the received input to the touch computing device via wireless transceiver 219 (FIG. 2) associated with the device. For instance, the stylus 103 may have received an input on the stylus 103 such as a click of the button on the stylus 103. In one embodiment, the wireless transceiver 219 includes a Bluetooth® transceiver, a wireless network transceiver, and/or some other wireless transceiver. The stylus 103 may have been previously paired with the touch computing device 206 and thus the received input may be transmitted over the Bluetooth® connection with the touch computing device 206. Alternatively or additionally, the stylus 103 may be in data communication with the touch computing device 206 over a wireless network and thus the received input may be transmitted via the wireless network 213 (FIG. 2) to the touch computing device 206.

Then, in step 1309, receipt of the transmitted input by the touch computing device 206 causes one or more actions to be performed. In some embodiments, the input may be received directly by the touch computing device 206 and may not need to be transmitted by the stylus 103. An application 263 (FIG. 1) being implemented by the touch computing device 206 may receive the input and perform an action that corresponds to the input. The one or more actions may be application specific where the same input may cause different actions to be performed according to the application 263 being implemented when the input is received. For example, the application 263 being implemented may be a browser that renders internet web pages. A received input, such as a tap with the tip 113 of the stylus 103, may cause a uniform resource location (URL) to be opened. As another example, the application 263 being implemented may be an image collection application where an input such as the tap causes the image collection application to share the selected image on a social networking platform.

Figure 14:
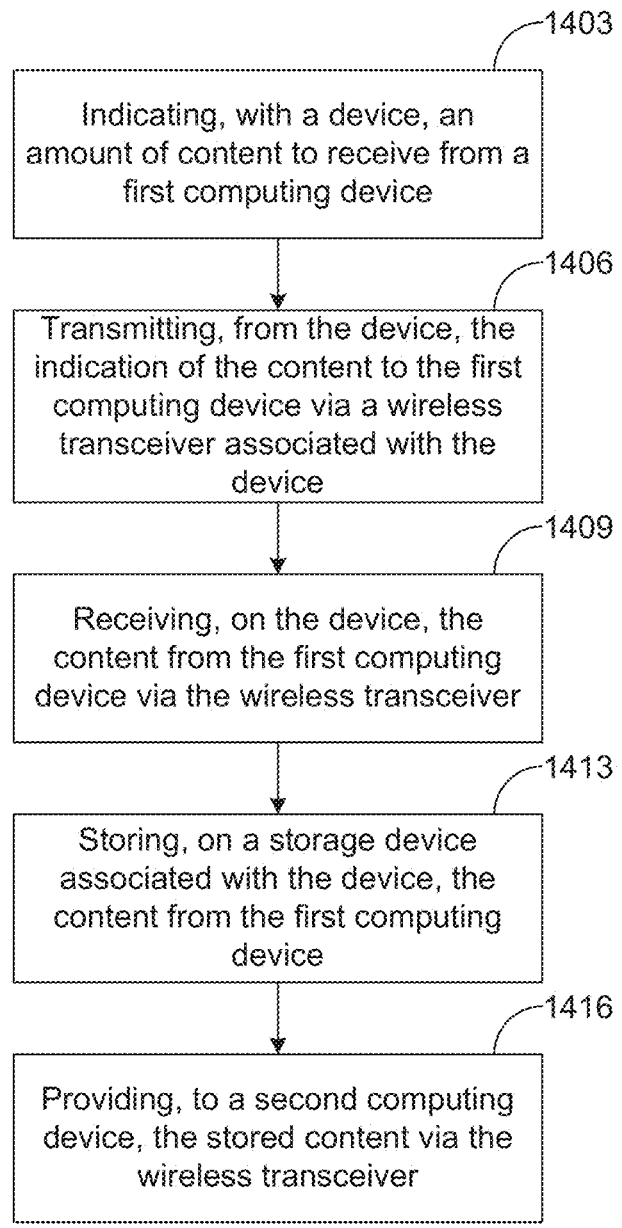
FIG. 14 is a flowchart illustrating an exemplary method for transferring content from a first touch computing device to a second touch computing device via a stylus.

FIG. 14 is a flowchart that provides one example of the operation of a portion of the system described herein. It is understood that the flowchart of FIG. 14 provides merely an example of the many different types of functional arrangements that may be employed to implement the operation of the portion of the system as described herein. As an alternative, the flowchart of FIG. 14 may be viewed as depicting an example of steps of a method implemented by the system described herein according to one or more embodiments.

Beginning with step 1403, a user may indicate with a device, such as the stylus 103 (FIG. 1), content 229 (FIG. 2) to receive from a first computing device. In one embodiment, the first computing device may be a touch computing device 206 (FIG. 2) that includes an interactive touch screen for receiving input via the stylus 103 and/or other device. Additionally, the indication may be one of a variety of inputs that may be indicated on the stylus 103. For example, the indication may be in the form of a tap, a click, a drag, a flick, and/or other indication as described above.

In step 1406, the indication of the content 229 may be transmitted from the device to the first computing device via a wireless transceiver 219 that is associated with the device. In one embodiment, the indication of the content 229 may be in the form of a click of a physical button located on the stylus 103, as discussed above. For example, the wireless transceiver 219 may be a Bluetooth® transceiver, a wireless network transceiver, and/or other wireless transceiver. Additionally, the device and the first computing device may have been previously paired, or the device and the first computing device may have established data communication over a network 213 (FIG. 1) thereby facilitating transmission of the indication. In one embodiment, the indication of the content 229 may be received directly by the first computing device. For example, the first computing device may receive a tap on the touch screen associated with the first computing device, and/or other forms of inputs indicated via the touch screen.

Next, in step 1409, the device receives the content 229 from the first computing device via the wireless transceiver 219. For example, the content 229 indicated by the device may be an image, a document, and/or other form of digital information. The first computing device may receive the indication and in response, transmit the indicated content 229 to the device. Then, in step 1413, the device may store the received content 229 in a memory 216 (FIG. 2), a storage device, and/or a network storage device 209 (FIG. 1) accessible via the network 213.

In step 1416, the device provides the stored content 229 to a second computing device, such as a second touch computing device 206, via the wireless transceiver 219. For example, the user operating the device may indicate to transmit the content 229 received from the first computing device and stored on the device to the second computing device via one or more inputs, as described above. In one embodiment, the stored content 229 is transmitted to the second computing device via a Bluetooth® transceiver, a wireless network transceiver, and/or other wireless transceiver, as described above.

General

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A stylus device comprising:
  a tip at an end of the stylus device, the tip for interacting with a touch surface of a computing device;
  a storage device disposed within a housing of the stylus device, the storage device for storing content; and
  a wireless transceiver for communicating and establishing an association with the computing device, wherein the wireless transceiver is coupled to the storage device and configured to provide content from the storage device to the computing device once the association between the stylus device and the computing device is established, and wherein the wireless transceiver is further configured to provide the computing device access to content from a cloud storage device, the cloud storage device being accessible to the computing device by way of the computing device having established the association with the stylus device.

2. The stylus device of claim 1, wherein the stylus device is encased in an aluminum material that houses at least one microprocessor, a memory, and a circuit board.

3. The stylus device of claim 1 further comprising a physical button, wherein the wireless transceiver is configured to communicate with the computing device in response to interaction with the physical button.

4. The stylus device of claim 1 configured to receive an input, the input being at least one of an amount of pressure applied to the stylus device against the computing device, a movement of the stylus device on or near the touch surface of the computing device, or one or more interactions with a physical button on the stylus device, wherein the stylus device is configured to cause one or more actions on the computing device based at least in part on the received input.

5. The stylus device of claim 4, wherein the one or more actions are application specific, the one or more actions determined based on an application currently being implemented on the one of the computing devices when the input is received.

6. The stylus device of claim 1, wherein the stylus device is associated with one or more licenses to one or more software applications, and wherein the wireless transceiver is also configured to communicate the one or more licenses to the computing device or any other computing device for operation of the one or more software applications under the terms of the one or more licenses when the stylus device is in communication with the computing device or the any other computing device.

7. The stylus device of claim 1 further comprising a light emitting diode (LED) that illuminates and changes color based on a state of the stylus device.

8. The stylus device of claim 1, wherein establishing the association includes electronically pairing the stylus device with the computing device.

9. The stylus device of claim 1, wherein establishing the association includes receiving a secure signature on the touch surface of the computing device provided by the tip at the end of the stylus device.

10. A method comprising:
  receiving an input on a computing device via a stylus device, the stylus device comprising a storage device housed therein and a wireless transceiver coupled to the storage device and configured to communicate with the computing device; and
  causing an action to be performed on the computing device based at least in part on the received input, wherein the action to be performed comprises providing the computing device access to content from a cloud storage device, the computing device being provided access to the content from the cloud storage device by way of the computing device being associated with the stylus device.

11. The method of claim 10 wherein the input comprising at least one of an amount of pressure applied to the stylus device against a computing device, or a movement of the stylus device against the computing device.

12. The method of claim 10, wherein the action to be performed comprises receiving content at the computer device, the content transmitted directly from a cloud storage device to the computer device.

13. The method of claim 10 wherein the input comprising an angle of the stylus device with respect to the computing device.

14. The method of claim 10, further comprising:
receiving an additional input via a button on the stylus device, the additional input being a click of the button;
transmitting the additional input to the computing device; and
causing the computing device to perform one or more actions based at least in part on the additional input.

15. A method comprising:
receiving, on a cloud storage device, content from a first computing device, the first computing device provided access to the cloud storage device via a wireless transceiver coupled to a stylus device, the receiving of the content occurring in response to interaction between the stylus device and a touch screen of the first computing device;
storing, on the cloud storage device, the content from the first computing device; and
providing, to a second computing device, access to the stored content via the wireless transceiver coupled to the stylus device, the providing of the stored content occurring in response to interaction between the stylus device and a touch screen of the second computing device.

16. The method of claim 15, further comprising:
indicating, with the stylus device, the content on the first computing device to be received by the cloud storage device.

17. The method of claim 16, wherein indicating the content comprises at least one of:
applying an amount of pressure on the stylus device against the first computing device;
clicking a physical button associated with the stylus device; or
causing a movement of the stylus device against the first computing device.

18. The method of claim 16, wherein indicating the content comprises positioning the stylus device against the first computing device at a known angle with respect to the first computing device.

19. The method of claim 15, wherein the wireless transceiver is at least one of a Bluetooth® transceiver or a wireless network transceiver, and wherein the wireless transceiver is operable to communicate to the first and second computing device a request to access the cloud storage device using one or more user accounts associated therewith.

20. The method of claim 15, wherein the stylus device is encased in an aluminum material that houses at least one microprocessor, a memory, and a circuit board.

\* \* \* \* \*